US011023962B2

(12) United States Patent
Armelin et al.

(10) Patent No.: US 11,023,962 B2
(45) Date of Patent: Jun. 1, 2021

(54) SEARCHING AVAILABLE RENTAL VEHICLES BASED ON ADJUSTABLE PARAMETERS

(71) Applicant: Amadeus S.A.S., Biot (FR)

(72) Inventors: Yann Armelin, Antibes (FR); Thibault Serot, Antibes (FR); Nolwenn Moeata Delphine Maïssa, Grasse (FR); Jean-Baptiste Barrau, Paris (FR); Patricio Astudillo, Ghent (BE)

(73) Assignee: AMADEUS S.A.S., Biot (FR)

( * ) Notice: Subject to any disclaimer, the term of this patent is extended or adjusted under 35 U.S.C. 154(b) by 967 days.

(21) Appl. No.: 15/170,553

(22) Filed: Jun. 1, 2016

(65) Prior Publication Data

US 2017/0352093 A1    Dec. 7, 2017

(51) Int. Cl.
| | |
|---|---|
| *G06Q 30/06* | (2012.01) |
| *G06Q 50/30* | (2012.01) |
| *G06F 16/29* | (2019.01) |
| *G06Q 10/02* | (2012.01) |
| *G06F 16/9535* | (2019.01) |

(52) U.S. Cl.
CPC ......... *G06Q 30/0645* (2013.01); *G06F 16/29* (2019.01); *G06F 16/9535* (2019.01); *G06Q 50/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0033621 | A1* | 2/2005 | Hartmann | G06Q 10/02 705/5 |
| 2007/0239494 | A1* | 10/2007 | Stephens | G06Q 10/02 705/5 |
| 2010/0106623 | A1* | 4/2010 | Menendez | G06F 17/243 705/26.1 |
| 2013/0325521 | A1* | 12/2013 | Jameel | G06Q 10/02 705/5 |

(Continued)

OTHER PUBLICATIONS

Gunther, Neil J. "Analyzing Computing System Performance with Perl::PDQ" Mar. 22, 2009, p. 299 (Year: 2009).*

(Continued)

*Primary Examiner* — Aryan E Weisenfeld
*Assistant Examiner* — Wenren Chen
(74) *Attorney, Agent, or Firm* — Thompson Hine LLP

(57) ABSTRACT

Methods, systems, and computer program products for providing available rental vehicle options to a user. The system includes a network interface with at least one rental provider computer system. The system receives a rental request for an available rental vehicle. The rental request includes a pick-up location and a drop-off location. In response to receiving the rental request, the system queries a rental store database for a plurality of available rental stores in both the pick-up location and the drop-off location. The system arranges the available rental stores into at least one cluster in the pick-up location and the drop-off location based on a geographical position of the available rental stores. The system selects a particular number of available rental stores within each cluster in both the pick-up location and the drop-off location.

17 Claims, 7 Drawing Sheets

(56) References Cited

U.S. PATENT DOCUMENTS

| | | | | |
|---|---|---|---|---|
| 2014/0075387 A1* | 3/2014 | Fujibayashi | .......... | G06F 3/0488 715/833 |
| 2014/0095502 A1* | 4/2014 | Ziauddin | ............... | G06F 16/283 707/737 |
| 2015/0142610 A1* | 5/2015 | Manoharan | ........ | G06Q 30/0629 705/26.64 |
| 2015/0339923 A1* | 11/2015 | Konig | ...................... | H04L 67/12 701/522 |
| 2016/0042445 A1* | 2/2016 | Beason | ............... | G06F 16/9535 705/5 |
| 2016/0247095 A1* | 8/2016 | Scicluna | ................ | G06Q 10/02 |

OTHER PUBLICATIONS

European Patent Office, extended search report issued in Application No. 17000887.4 dated Jun. 12, 2017.
AutoEurope.com, "Europe Car Rental: Best Price Guaranteed", Apr. 4, 2016, Retrieved from the internet at http://web.archive.org/web/20160404070836/http://www.autoeurope.com.

* cited by examiner

100 ↴

| Vehicle Identification (ID) Number | ACRISS Code | Ranking |
|---|---|---|
| 1 | ECMR | 1 |
| 2 | ECMR | 8 |
| 3 | ECMR | 9 |
| 4 | EDMR | 4 |
| 5 | EDMD | 7 |
| 6 | IDMR | 2 |
| 7 | IDAR | 6 |
| 8 | IVMR | 5 |
| 9 | FDMR | 3 |

FIG. 5

| ZE- 50€ | ZE- 50€ 2 | ZE- 50€ 2 | ZE- 50€ 2 |
| ZE- 62€ | ZE- 62€ 4 | ZE- 62€ 4 | ZE- 62€ 4 |
| ZE- 70€ | ZE- 70€ 6 | ZE- 70€ 6 | ZE- 70€ 6 |
| ZE- 86€ | ZE- 86€ 8 | ZE- 86€ 8 | ZE- 86€ 8 |
| ZE- 110€ | ZE- 110€ 10 | ZE- 110€ ~~10~~ | EP- 38€ 1 |
| ZE- 55€ | ZE- 55€ 12 | ZE- 55€ ~~12~~ | EP- 45€ 3 |
| EP- 38€ | EP- 38€ 1 | EP- 38€ 1 | EP- 55€ 5 |
| EP- 45€ | EP- 45€ 3 | EP- 45€ 3 | EP- 75€ 7 |
| EP- 55€ | EP- 55€ 5 | EP- 55€ 5 | FIG. 7D |
| EP- 75€ | EP- 75€ 7 | EP- 75€ 7 | |
| EP- 90€ | EP- 90€ 9 | EP- 90€ ~~9~~ | |
| EP- 42€ | EP- 42€ 11 | EP- 42€ ~~11~~ | |
| EP- 50€ | EP- 50€ 13 | EP- 50€ ~~13~~ | |
| FIG. 7A | FIG. 7B | FIG. 7C | |

SEARCHING AVAILABLE RENTAL VEHICLES BASED ON ADJUSTABLE PARAMETERS

TECHNICAL FIELD

The invention generally relates to computers and computer software, and in particular to methods, systems, and computer program products for providing available rental vehicles options to a user.

BACKGROUND

Computer technology is increasingly used to manage, support, book, reserve, and process reservations as well as data associated therewith. Generally, third party reservation agents (i.e., travel agents) or travelers may utilize computer-based devices in order to create a reservation for a vehicle rental. Specifically, a reservation agent or traveler may first create a request to rent a vehicle, such as a car, using a vehicle rental system. The request may include a pick-up location, a drop-off location, and the duration of the vehicle rental. Based on the request, a listing of potential vehicle rental locations, the corresponding vehicles that are available for rental, and the respective rental rates of the vehicles may be provided to the traveler. However, the computer systems utilized by at least some rental providers tend to have relatively low processing power. As a result, these computer systems may have limited capabilities, and therefore are only able to process a limited number of requests in a given period of time. Furthermore, it should also be appreciated that some towns and cities tend to have multiple locations where an individual may drop off or pick up a vehicle. In fact, some of the largest cities in the world such as, for example, New York City or Paris have a vast number of locations where an individual may either collect or return a vehicle.

As a result of the above-mentioned challenges, it may not be possible to communicate all of the potential rental options to a traveler, since sometimes the list of available rental locations within a particular city would be extremely lengthy. It may also not be possible to display all of the potential rental options because of the limited processing power of the rental provider computer systems. Specifically, in response to receiving a particular request for a reservation for a car rental, the vehicle rental system sends a message to one or more specific rental provider. The rental providers may then search their database to determine their availability. However, because the rental providers tend to have computer systems with lower processing power, only a limited number of options may actually be communicated back to the traveler.

The rental options that are actually communicated back to the vehicle rental system may be determined based on an alphabetical code representing a particular location where an available rental vehicle is located. For example, car rental locations that are extremely popular may be coded using the first few letters of the alphabet. Some examples of locations that have a tendency to be popular with travelers include rental locations situated nearby an airport or a train station, as well as important or centralized locations in a city. Thus, the car rental options that are communicated back to the vehicle rental system may not represent a complete geographical coverage of the city. Moreover, the car rental options that are actually communicated back to the vehicle rental system may not offer the lowest prices for a rental vehicle within a particular city as well.

It should be appreciated that travelers may not have the ability to modify the approach used to determine the car rental options that are actually communicated back to the vehicle rental system. This may become problematic if a traveler would like to reserve a car from a rental store that offers the lowest price for a rental vehicle within a particular geographical region, regardless of the location of the rental store. Finally, the rental options communicated back to the vehicle rental system may reflect a limited choice of vehicles.

Thus, improved methods, systems, and computer program products for determining vehicle rental locations are needed that improve the efficiency of processing data by computer-based devices.

SUMMARY

In an embodiment of the invention, a system for providing available rental vehicles to a user is disclosed. The system includes a network interface with at least one rental provider computer system. The system receives a rental request for an available rental vehicle. The rental request includes a pick-up location and a drop-off location. In response to receiving the rental request, the system queries a rental store database for a plurality of available rental stores in both the pick-up location and the drop-off location. The system arranges the available rental stores into at least one cluster in the pick-up location and the drop-off location based on a geographical position of the available rental stores. The system selects a particular number of available rental stores within each cluster in both the pick-up location and the drop-off location. The system creates a set of data comprising origin and destination pairs with the selected rental stores in pick-up and drop-off location. The system queries the at least one rental provider computer system for rate and availability information of rental vehicles for the origin and destination pairs.

In another embodiment of the invention, a method for providing available rental vehicles to a user is disclosed. The method includes receiving a rental request for an available rental vehicle by a computer. The rental request includes a pick-up location and a drop-off location. In response to receiving the rental request, the method includes querying, by the computer, a rental store database for a plurality of available rental stores in both the pick-up location and the drop-off location. The method includes arranging the available rental stores into at least one cluster in at least one of the pick-up location and the drop-off location based on a geographical position of the available rental stores. The method includes selecting a particular number of available rental stores within each cluster in both the pick-up location and the drop-off location by the computer. The method includes creating a set of data comprising origin and destination pairs with the particular number of available rental stores in pick-up and drop-off location. Finally, the method includes querying at least one rental provider computer system for rate and availability information of rental vehicles for the origin and destination pairs.

In another embodiment of the invention, a computer program product is provided for presenting available rental vehicles. The computer program product comprises a non-transitory computer-readable storage medium and program code stored on the non-transitory computer-readable storage medium that, when executed by one or more processors, causes the one or more processors to receive a rental request for an available rental vehicle. The rental request includes a pick-up location and a drop-off location. In response to receiving the rental request, the system queries a rental store database for a plurality of available rental stores in both the pick-up location and the drop-off location. The system arranges the available rental stores into at least one cluster in the pick-up location and the drop-off location based on a geographical position of the available rental stores. The system selects a particular number of available rental stores within each cluster in both the pick-up location and the drop-off location. The system creates a set of data comprising origin and destination pairs with the selected rental stores in pick-up and drop-off location. The system queries the at least one rental provider computer system for rate and availability information of rental vehicles for the origin and destination pairs.

In one embodiment, the pick-up location and the drop-off location may be different locations or the same location, or one could include at least a portion the other.

In one embodiment, the program code, when executed by one or more processors of a vehicle rental system, further causes this system to in response to receiving a return message from the at least one rental provider, rank a plurality of available vehicles included within the return message. Ranking the available vehicles includes assigning, for the at least one rental provider, each of the available vehicles an identification (ID) number, where the ID number is based on specific vehicle characteristics and a rental rate associated with each of the available vehicles. The specific vehicle characteristics include a plurality of individual vehicle attributes. Ranking the available vehicles also includes ranking each of the available vehicles based on a lowest priced vehicle for each individual vehicle attribute.

In one embodiment of the invention, the specific vehicle characteristics may include attributes defined by an association of car rental industry systems standards (ACRISS) code.

In one embodiment of the invention, the program code, when executed by the one or more processors of a vehicle rental system, may further cause the system to build a first message containing the individual vehicle attributes for the available vehicles. The system may be further caused to store the first message in memory. The system may further be caused to build a second message including both the individual vehicle attributes and a rental rate for the available vehicles. The system may further be caused to compare a size of the first message with a size of the second message, and determine if the size of the second message exceeds a predetermined size.

In one embodiment of the invention, the program code, when executed by the one or more processors of a vehicle rental system, may further cause the system to in response to the size of the second message exceeding the predetermined size, determine an average size of an individual rental rate for each of the available vehicles. The system may further be caused to determine a total number of rental rates to be discarded such that the second message does not exceed the predetermined size.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 5 is an exemplary list of available vehicles for a particular rental store of a particular rental provider, where each available vehicle is associated with an association of car rental industry systems standards (ACRISS) code.

FIGS. 7A-7D an exemplary diagram demonstrating the vehicle rental system shown in FIG. 3 discarding several rental rates.

DETAILED DESCRIPTION

Figure 1:
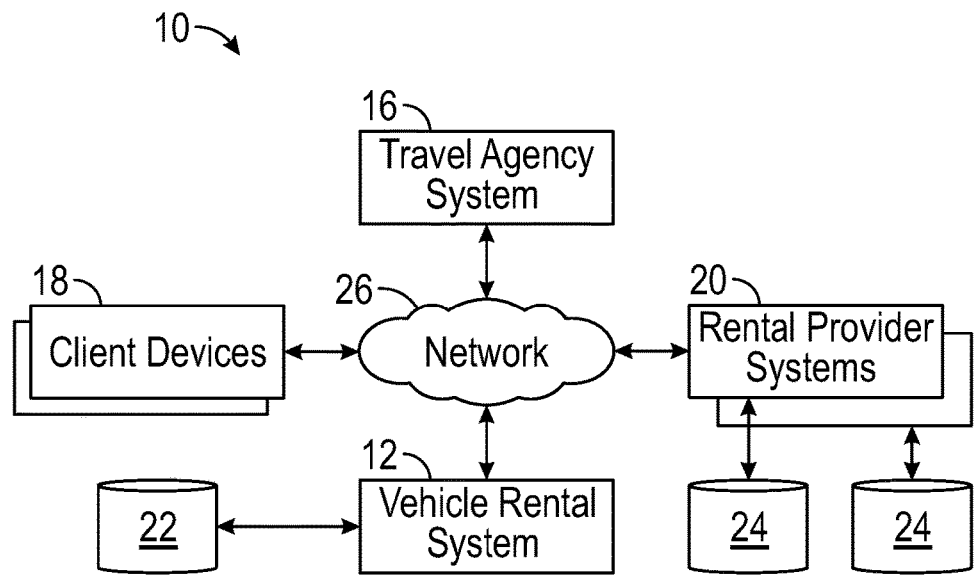
FIG. 1 is a diagrammatic view of an exemplary operating environment including a vehicle rental system in communication with a plurality of client devices via a network.

Referring now to FIG. 1, an operating environment 10 in accordance with an embodiment of the invention may include a vehicle rental system 12, one or more indirect seller systems, such as travel agency system 16, one or more client devices 18, and one or more rental provider computer systems 20. The vehicle rental system 12 may communicate with the rental provider computer systems 20 through one or more network interfaces that may be, for example, an application program interface (API). The vehicle rental system 12 may be in communication with one or more databases 22. As explained in greater detail below, the database 22 may contain information related to various rental stores in various locations. Each of the vehicle rental system 12, travel agency system 16, client devices 18, and rental provider computer systems 20 may communicate through a network 26. The network 26 may include one or more private or public networks (e.g., the Internet) that enable the exchange of data.

The vehicle rental system 12 may be configured to facilitate communication between the travel agency system 16 and the client devices 18 by enabling travel agents and travelers to book vehicle rental reservations using the vehicle rental system 12. As explained in greater detail below, the vehicle rental system 12 may query one or more rental provider computer systems 20 to search for available rental vehicles, and provides a list of available rental vehicles to either the travel agency system 16 or one of the client devices 18. The travel agency system 16 may provide travel agents with an interface for accessing the vehicle rental system 12 that enables agents to search for and book rental vehicles. The travel agency system 16 may also include an application accessible by the client devices 18 that enables travelers to search for and book a rental vehicle, without the help of a travel agent. This application may comprise, for example, a rental vehicle-related website that is accessible over the network 26 using a web-browser provided by the travel agency system 16.

The client devices 18 may each comprise a desktop computer, laptop computer, tablet computer, smart phone, or any other suitable computing device. The traveler may use a respective client device 18 to search for and book vehicle rentals by accessing the vehicle rental system 12 though the network 26. For example, the traveler may launch a browser application, and use the browser application to search for vehicles available for rent on the website provided by the travel agency system 16, or any other suitable system. As explained in greater detail below, the traveler may book or reserve a selected vehicle for a specified amount of time by using the website.

The rental provider computer systems 20 may each be associated with a particular vehicle rental provider. A vehicle rental provider may be an entity that provides the rental vehicles that a travel agent or a traveler may reserve. Some examples of rental providers include, but are not limited to, Hertz® and Europcar. Each rental provider computer system 20 may include a respective database 24. The database 24 may store data pertaining to the vehicles available for rental by a particular rental provider. Specifically, the database 24 may indicate the vehicles that are available at a particular vehicle rental store. The database 24 may also include specific information associated with each vehicle such as, but not limited to, the rental rates and various vehicle attributes associated with a particular vehicle. In one embodiment, the vehicle attributes may be defined by the association of car rental industry systems standards (AC-RISS) codes. ACRISS codes include four distinct characters which each indicate a specific characteristic of a particular vehicle, which is described in greater detail below.

A traveler or a travel agent may reserve a vehicle for a specified range of dates by first sending a request to the vehicle rental system 12. The request may include a pick-up date that indicates the date which the traveler wants to collect the vehicle from a particular rental provider as well as a drop-off date that indicates the date which the traveler wants to return the vehicle back to the rental provider. The request may also include a pick-up location and a drop-off location. The pick-up location may indicate a particular city, town, or defined geographical region where the traveler wants to collect the vehicle from the rental provider. For example, a traveler may want to collect the vehicle from a vehicle rental store in a particular city such as, for example, New York City. The drop-off location may indicate a particular city, town, or geographical region where the traveler wants to return the vehicle back to the rental provider.

It is to be appreciated that in one embodiment the pick-up location may be different from the drop-off location. For example, the traveler may wish to make a one-way trip from Seattle to San Francisco. Thus, the traveler would collect the vehicle at a vehicle rental store in Seattle and return the vehicle at another vehicle rental store in San Francisco. However, in another embodiment, the pick-up and drop-off locations may be the same. For example, the pick-up location may be a particular vehicle rental store within a particular city, and the drop-off location may be another vehicle rental store within the same city. Alternatively, the pick-up location and the drop-off location may be the same store.

Figure 2:
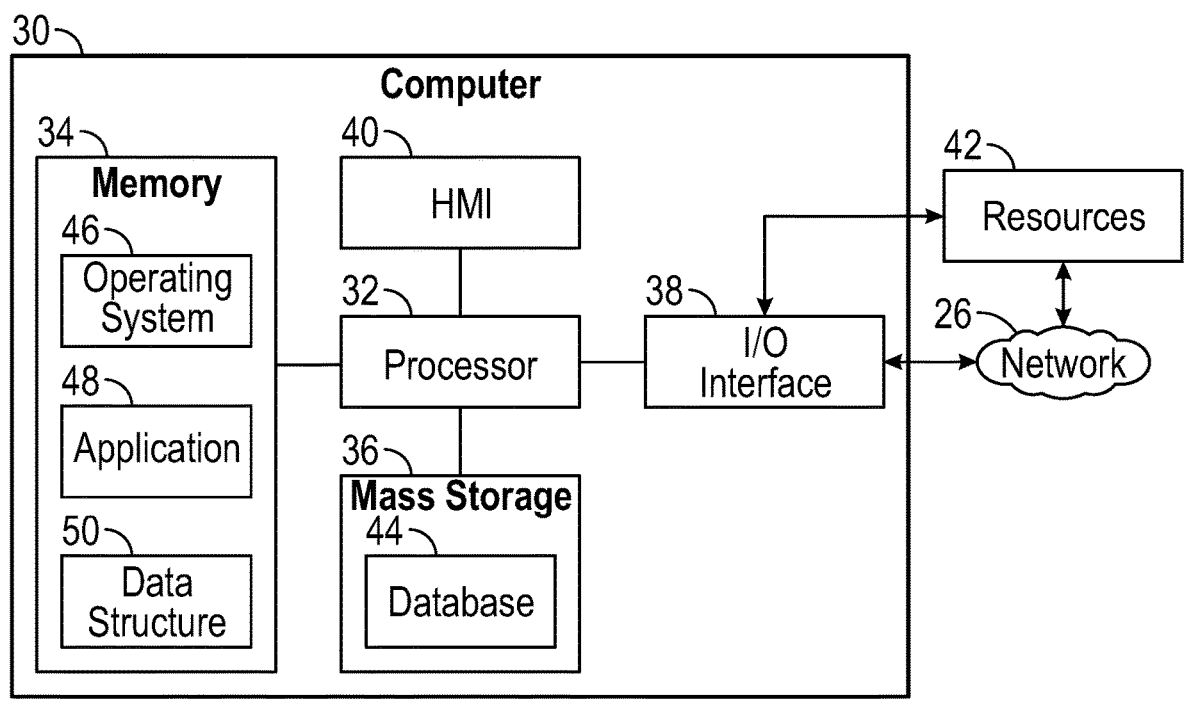
FIG. 2 is a diagrammatic view of an exemplary computer system of FIG. 1.

Referring now to FIG. 2, the vehicle rental system 12, travel agency system 16, client devices 18, and rental provider computer systems 20 of operating environment 10 may be implemented on one or more computer devices or systems, such as exemplary computer system 30. The computer system 30 may include a processor 32, a memory 34, a mass storage memory device 36, an input/output (I/O) interface 38, and a Human Machine Interface (HMI) 40. The computer system 30 may also be operatively coupled to one or more external resources 42 via the network 26 or I/O interface 38. External resources may include, but are not limited to, servers, databases, mass storage devices, peripheral devices, cloud-based network services, or any other suitable computer resource that may be used by the computer system 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, volatile or non-volatile solid state device, or any other device capable of storing information.

The processor 32 may operate under the control of an operating system 46 that resides in memory 34. The operating system 46 may manage computer resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, or application 48 to store or manipulate data.

The I/O interface 38 may provide a machine interface that operatively couples the processor 32 to other devices and systems, such as the network 26 or external resource 42. The application 48 may thereby work cooperatively with the network 26 or external resource 42 by communicating via the I/O interface 38 to provide the various features, functions, applications, processes, or modules comprising embodiments of the invention. The application 48 may also have program code that is executed by one or more external resources 42, or otherwise rely on functions or signals provided by other system or network components external to the computer system 30. Indeed, given the nearly endless hardware and software configurations possible, persons having ordinary skill in the art will understand that embodiments of the invention may include applications that are located externally to the computer system 30, distributed among multiple computers or other external resources 42, or provided by computing resources (hardware and software) that are provided as a service over the network 26, such as a cloud computing service.

The HMI 40 may be operatively coupled to the processor 32 of computer system 30 in a known manner to allow a user to interact directly with the computer system 30. The HMI 40 may include video or alphanumeric displays, a touch screen, a speaker, and any other suitable audio and visual indicators capable of providing data to the user. The HMI 40 may also include input devices and controls such as an alphanumeric keyboard, a pointing device, keypads, push-buttons, control knobs, microphones, etc., capable of accepting commands or input from the user and transmitting the entered input to the processor 32.

A database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules.

Figure 3:
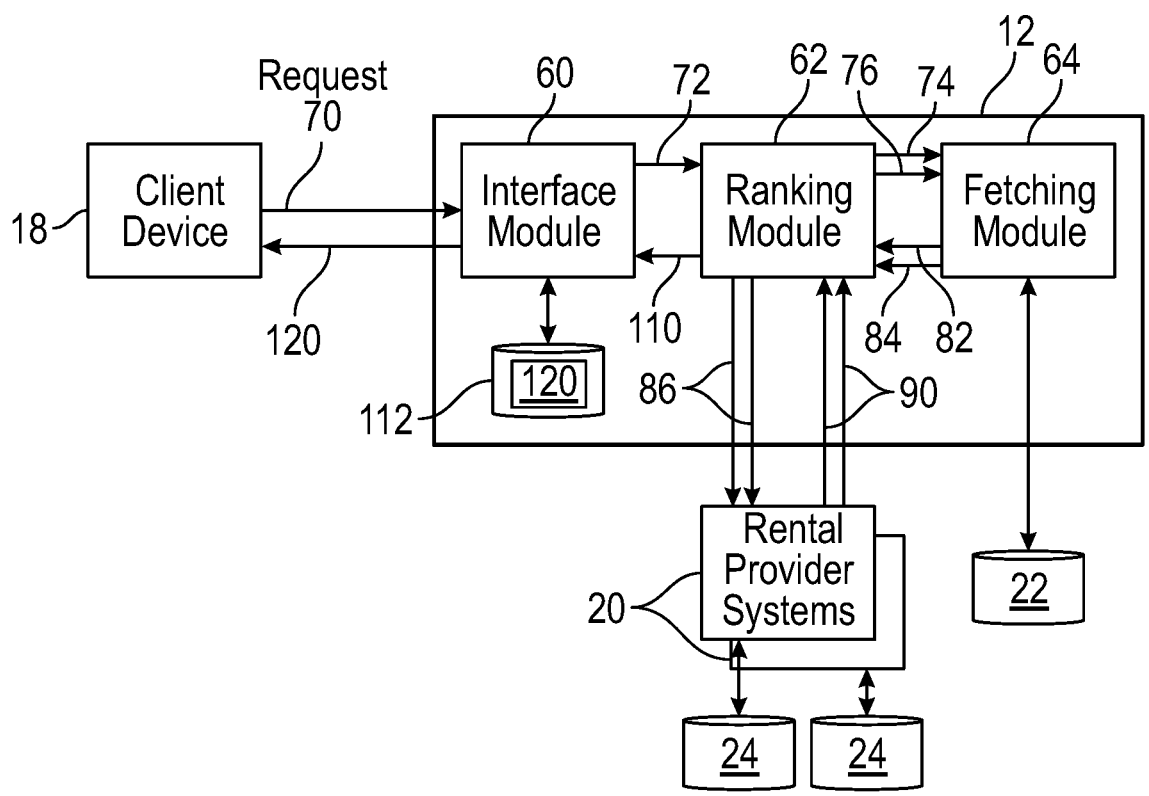
FIG. 3 is a diagrammatic view of the vehicle rental system of FIG. 1, where the vehicle rental system is in communication with one or more rental provider computer systems.

Turning now to FIG. 3, in an exemplary embodiment of the disclosure the vehicle rental system 12 may include an interface module 60, a ranking module 62, and a fetching module 64. The interface module 60 of the vehicle rental system 12 may be in communication with one of the client devices 18. Alternatively, the interface module 60 of the vehicle rental system 12 may be in communication with the travel agency system 16 (shown in FIG. 1). The modules 60, 62 and 64 are shown as distinct components, which may indicate the use of modular programming techniques. However, the software design may decrease the extent to which the modules 60, 62 and 64 are distinct by combining at least some program functions of multiple modules into a single module. Moreover, those of ordinary skill in the art will readily understand that the functions attributed to the modules 60, 62 and 64 may be distributed in other ways, or on other systems than those depicted. Thus, embodiments of the invention are not limited to the specific arrangement of systems or modules shown in FIG. 3.

The interface module 60 of the vehicle rental system 12 may serve as an interface between the client device 18 and the ranking module 62. The interface module 60 of the vehicle rental system 12 receives a rental request 70 from the client device 18. Specifically, the traveler may enter the request using the HMI 40 (FIG. 2) of the client device 18. The rental request 70 may be a query for rates pertaining to a rental vehicle. In one embodiment, the rental request 70 may specify a particular rental provider. However, it is to be appreciated that the rental request 70 may not specify a particular rental provider, and instead all of the rental providers offering vehicles for rent in a particular city or geographical region may be searched for appropriate rental vehicles as well. In one embodiment, the vehicle rental system 12 may include an interface for receiving user input (not illustrated). Specifically, the user interface includes a screen displaying a setting bar and a cursor. The cursor may be slid along the setting bar to adjust the value of an input, which is explained in greater detail below.

The rental request 70 may include the pick-up date, the drop-off date, the pick-up location, the drop-off location, and a rental store coverage ratio R. The coverage ratio R determines how rental stores within a particular city are selected and may be adjusted between a minimum value representing a selection of rental stores based on the lowest prices offered for vehicle rentals in the city and a maximum value representing a selection of rental stores based on the most comprehensive geographical coverage of the city. The rental store coverage ratio R may be adjusted by a user by sliding the cursor along the setting bar of the user interface of the vehicle rental system 12. The vehicle rental system 12 may determine a number of clusters as well. Clusters may be defined as a set of objects having at least one common characteristic. In the present disclosure, a cluster is a set of available rental stores within a city. As explained in greater detail below, the number of clusters within a particular city may be based on the rental store coverage ratio R as well as the computing power of the rental provider computer system 20. The computing power of a particular computing system may be defined as the number of requests that a processor of the computing system is capable of processing in a given period of time.

In one embodiment, the coverage ratio R is a user-defined value that may be adjusted based on two extreme values. Specifically, the coverage ratio may vary between a one-cluster value and a maximum-cluster value. The one-cluster value represents arranging the available rental stores within a particular city as a single cluster. The maximum-cluster value represents arranging the available rental stores by dividing an entire set of available rental stores into a maximum number of clusters possible. For example, when the coverage ratio R is at its minimum or lowest value of 0, then rental stores offering the lowest priced rental vehicles available between the pick-up date and the drop-off date in a particular city or town may be communicated back to the traveler through the client device 18. However, when the coverage ratio R is at its maximum or greatest value of 1, then the vehicle rental system 12 will search for rental stores offering vehicles available between the pick-up date and the drop-off date that provide the most comprehensive geographical coverage of the city or town being searched.

It is to be appreciated that the coverage ratio R may be adjusted by the traveler based on the specific preferences that the traveler may have. For example, a traveler may prefer to rent a vehicle based simply on price, regardless of where the rental store is located within a city. Thus, the traveler would adjust the coverage ratio R to its minimum value. Alternatively, a traveler may prefer to only rent a vehicle at a particular location, such as at the outskirts of a particular city, regardless of price. Thus, the traveler would adjust the coverage ratio R to its maximum value. In another embodiment, the traveler may adjust the coverage ratio R so as to obtain a relatively low price for a rental vehicle, while at the same time covering a substantial portion of a particular city. Thus, the value of the coverage ratio R may be a mid-range value such as, for example, 0.5 in order to account for both price and location of potential rental vehicles.

In response to receiving the rental request 70, the interface module 60 may determine if the rental request 70 involves a single or multiple rental providers. If the rental request 70 involves only a single rental provider, then the interface module 60 only generates a single request 72. However, if the rental request 70 involves multiple rental providers, then the interface module 60 generates multiple requests 72. Specifically, the interface module 60 generates a request 72 for each rental provider involved. The interface module 60 may send the request or requests 72 to the ranking module 62.

The ranking module 62 may select rental stores for a particular rental provider in both the pick-up location and the drop-off location based on the coverage ratio R. The ranking module 62 may also combine the rental stores into pairs, where one of the rental stores is located in the pick-up location and a remaining rental store is located in the drop-off location. The ranking module 62 may also request the rates associated with specific rental vehicles from the fetching module 64, and may rank and select the rates before returning the rates to the interface module 60. Specifically, in response to receiving a single request 72 from the interface module 60, the ranking module 62 may send two messages 74 and 76 to the fetching module 64. The message 74 may query the rental stores in the pick-up location indicated in the rental request 70 for the particular rental provider. The message 76 may query the rental stores in the drop-off location indicated in the rental request 70 for the particular rental provider.

The fetching module 64 may be in communication with the database 22. The database 22 may include information indicating the rental stores located within the pick-up location and the drop-off location for the particular rental provider. In response to receiving the messages 74 and 76, the fetching module 64 may search the database 22 for all rental stores in the pick-up location and the drop-off location. The fetching module 64 may then send return messages 82 and 84 to the ranking module 62. The return message 82 may include a list of all the rental stores in the pick-up location for the particular rental provider, and the return message 84 may include a list of all the rental stores in the drop-off location.

In response to receiving the return message 82, the ranking module 62 may select specific rental stores in the pick-up location based on the coverage ratio R. Similarly, in response to receiving the return message 84, the ranking module 62 may select specific rental stores in the drop-off location based on the coverage ratio R. Selection of the specific rental stores in both the pick-up location and the drop-off location may be based on a clustering algorithm, which is explained in greater detail below. Once the ranking module 62 selects the specific rental stores in both the pick-up location and the drop-off location, the ranking module 62 may then send an availability request 86 to a particular rental provider computer system 20. The availability request 86 inquires about rental rates and availability in the pick-up location.

It is to be appreciated that the computing systems associated with the rental provider computer systems 20 may have a relatively low processing power. As a result, the rental provider computer system 20 may only be able to process a limited number of queries in a given period of time. Thus, the ranking module 62 needs to constrain the number of queries within the availability request 86 sent to a particular rental provider computer system 20. Specifically, the ranking module 62 may limit the number of queries within the availability request 86 sent to the rental provider computer system 20 to a number that the rental provider computer system 20 may process in a given period of time. The number of queries that the rental provider computer system 20 is capable of processing in a given period of time, which is also referred to as computing power, may be denoted as z, and is an integer. The number of queries included with the availability request 86 sent to a particular rental provider computer system 20 should not exceed the computing power z.

The ranking module 62 may first determine a geometric center of all rental stores located within the pick-up location and the drop-off location based on a set of global positioning system (GPS) coordinates associated with each rental store located within the city or town. Specifically, the GPS coordinates for each rental store include a x-coordinate and y-coordinate. The ranking module 62 may determine an arithmetic mean of all x-coordinates of all rental stores within a particular city, which is expressed in Equation 1 as:

$$x = \frac{\text{sum}(x[i])}{N} \quad \text{Equation 1}$$

where x represents the arithmetic mean of all x-coordinates of the rental stores located within the particular geographic region, and N is the total number of rental stores located within the particular city. The ranking module 62 may also determine an arithmetic mean of all y-coordinates of all rental stores within the particular city, which is expressed in Equation 2 as:

$$y = \frac{\text{sum}(y[i])}{N} \quad \text{Equation 2}$$

where y represents the arithmetic mean of all y-coordinates of the rental stores located within the particular city. The geometric center of all the rental stores within the particular city is the arithmetic mean of the x-coordinate and the y-coordinate determined in Equations 1 and 2.

Once the geometric centers of all rental stores located within the pick-up location and the drop-off location are determined, the ranking module 62 of the vehicle rental system 12 may then discard any rental stores that are situated more than a predetermined distance from the geometric center of the city. The predetermined distance is selected such that the vehicle rental system 12 may only search for rental stores that are actually part of a particular city or town. Any rental stores that are located further away from the geometric center of the particular geographic region may be discarded since these stores are not relevant to the search, and may actually be erroneously included as part of a particular city. In fact, sometimes a rental store may specify its location within a particular city, even if the store is actually located in suburb of a particular city. For example, a rental store may include a city code associated with Paris, but the rental store may actually be located 120 kilometers from the geographical center of Paris.

The ranking module 62 may discard any rental stores situated more than the predetermined distance from the geographical center of the pick-up location and the drop-off location in both the x-direction and the y-direction. Specifically, in one exemplary embodiment the predetermined distance in the x-coordinate based system is about 100 kilometers. Thus, any rental stores located more than about 100 kilometers from the geometric center of the particular city in the x-direction may be discarded. Similarly, if the predetermined distance in the y-direction is about 50 kilometers, then any rental stores located more than about 50 kilometers from the geometric center of the particular city in the y-direction may be discarded.

The ranking module 62 of the vehicle rental system 12 may then select an initial rental store that is located furthest away from the geometric center of the particular city as a starting point of an initial or first cluster of rental stores within the particular city. The rental stores located within a particular city may be divided into at least one cluster. It is to be appreciated that each rental store located within the particular city is part of a cluster. The clusters may be calculated based on the geographical positioning of the available rental stores in the pick-up and drop-off location. However, it should be appreciated that in some approaches, only a single cluster may be calculated. For example, as seen in FIG. 4B, only a single cluster is calculated for New York City, which is explained in greater detail below.

Turning back to FIG. 3, the fixed number of rental stores within each cluster of a particular city may be equal to one another, or may differ at most by only one rental store. Specifically, if a total number of rental stores located within the particular city is divided by a total number of clusters k within the particular city and yields an integer, then the fixed number of rental stores will be the same for each cluster within the particular city. However, if the total number of rental stores located within the particular city or is divided by the total number of clusters k within the particular city and does not yield an integer, then at least one of the clusters within the particular city will include an extra rental store. It is to be appreciated that attributing a similar or identical number of rental stores within each cluster of a particular city or town may ensure that areas with a high density of rental stores include more clusters and therefore will be weighted higher than areas with a low density of rental stores.

The ranking module 62 of the vehicle rental system 12 selects the initial rental store located furthest away from the geometric center of the particular geographic region as a starting point, and then adds a rental store located within the closest proximity to the first cluster. The ranking module 62 may continue to add rental stores to the initial cluster until the first cluster contains the fixed number of stores. Once the first cluster has been calculated by the ranking module 62, the ranking module 62 may update the geometric center of the particular city if there are remaining rental stores within the particular geographical region. Then, the ranking module 62 may calculate a second cluster. The ranking module 62 may continue to update the geometric center of the particular city and calculate clusters until all of the rental stores within the particular city are part of a cluster.

The total number of clusters k within the particular city is calculated based on the coverage ratio R, the total number of rental stores located within the particular city, and the computing power z. In one embodiment, if the pick-up location is different from the drop-off location, then the total number of clusters k may be determined by Equation 3 as:

$$k = \text{ceil}(R * \min(\text{total number of rental stores within the particular city}, \text{floor sqrt}(z))) \quad \text{Equation 3}$$

However, if the coverage ratio R is a one-cluster value, then k=1.

However, if the pick-up location is the same as the drop-off location, then the total number of clusters k may be determined by Equation 4 as:

$$k = \text{ceil}(R * \min(\text{total number of rental stores within the particular city}, (z))) \quad \text{Equation 4}$$

However, if the coverage ratio R is a one-cluster value, then k=1.

The vehicle rental system 12 may include one or more processors that ensure that the number or queries sent to the rental provider computer system 20 does not exceed the computing power of the processor of the rental provider computer system 20. Since the total number of clusters k of a particular city are determined based on the computing power z, this ensures that once the ranking module 62 pairs together the pick-up locations and the drop-off locations in a query to the rental provider computer system 20, the number of queries will not exceed the computing power z. Furthermore, the total number of clusters k is also determined based on the coverage ratio R. Specifically, a higher value of the coverage ratio R results in an increased total number of clusters k, and more geographical zones of the particular city will be covered.

Once all of the clusters within the particular city have been calculated and there are no rental stores within the particular city that are not part of a cluster, then the ranking module 62 may select rental stores within each cluster of a particular city, which is denoted as a particular number of rental stores n. It is to be appreciated that the selected rental stores are included with one of the availability requests 86 that are sent to the rental provider computer system 20. Selecting a portion of the available rental stores in each cluster may be determined based on the total number of clusters k and the computing power of the rental provider computer system 20. In one embodiment, if the pick-up location is different from the drop-off location, then the particular number of rental stores n may be determined by Equation 5:

$$n = \frac{\min\left(\begin{array}{c}\text{total number of rental stores within} \\ \text{the particular city}, \text{floor } sqrt(z)\end{array}\right)}{k} \quad \text{Equation 5}$$

However, if the pick-up location is the same as the drop-off location, then the particular number of rental stores n may be determined by Equation 6:

$$n = \frac{\min\left(\begin{array}{c}\text{total number of rental stores within} \\ \text{the particular city}, (z)\end{array}\right)}{k} \quad \text{Equation 6}$$

As may be seen in both Equations 5 and 6, the particular number of rental stores n of a particular city is determined based on the computing power z. This ensures that the number of queries sent to the rental provider computer system 20 will not exceed the computing power z.

It is to be appreciated that the ranking module 62 of the vehicle rental system 12 may select the particular number of rental stores n within at least one cluster of a particular city based on the coverage ratio R. For example, if the coverage ratio R is at its minimum value of 0, then the ranking module 62 of the vehicle rental system 12 may only select rental stores located within a single cluster. In particular, the ranking module 62 of the vehicle rental system 12 may only select the rental stores within the single cluster that offer the lowest available prices for rental vehicles. In contrast, if the coverage ratio R is at its maximum value of 1, then the ranking module 62 may divide the particular city into the total number of clusters k and select the particular number of rental stores n. Similarly, if the coverage ratio R is at a value between two extremes, for example 0 and 1, then the ranking module 62 may divide the particular city into the total number of clusters k, and then selects the particular number of rental stores n based on the specific value of the coverage ratio R. Once the particular number of rental stores n have been determined for both the pick-up location and the drop-off location, then a set of data including an origin and a destination pair may be determined. The origin and destination pair includes the selected rental stores in the pick-up location and the drop-off location.

Figure 4A:
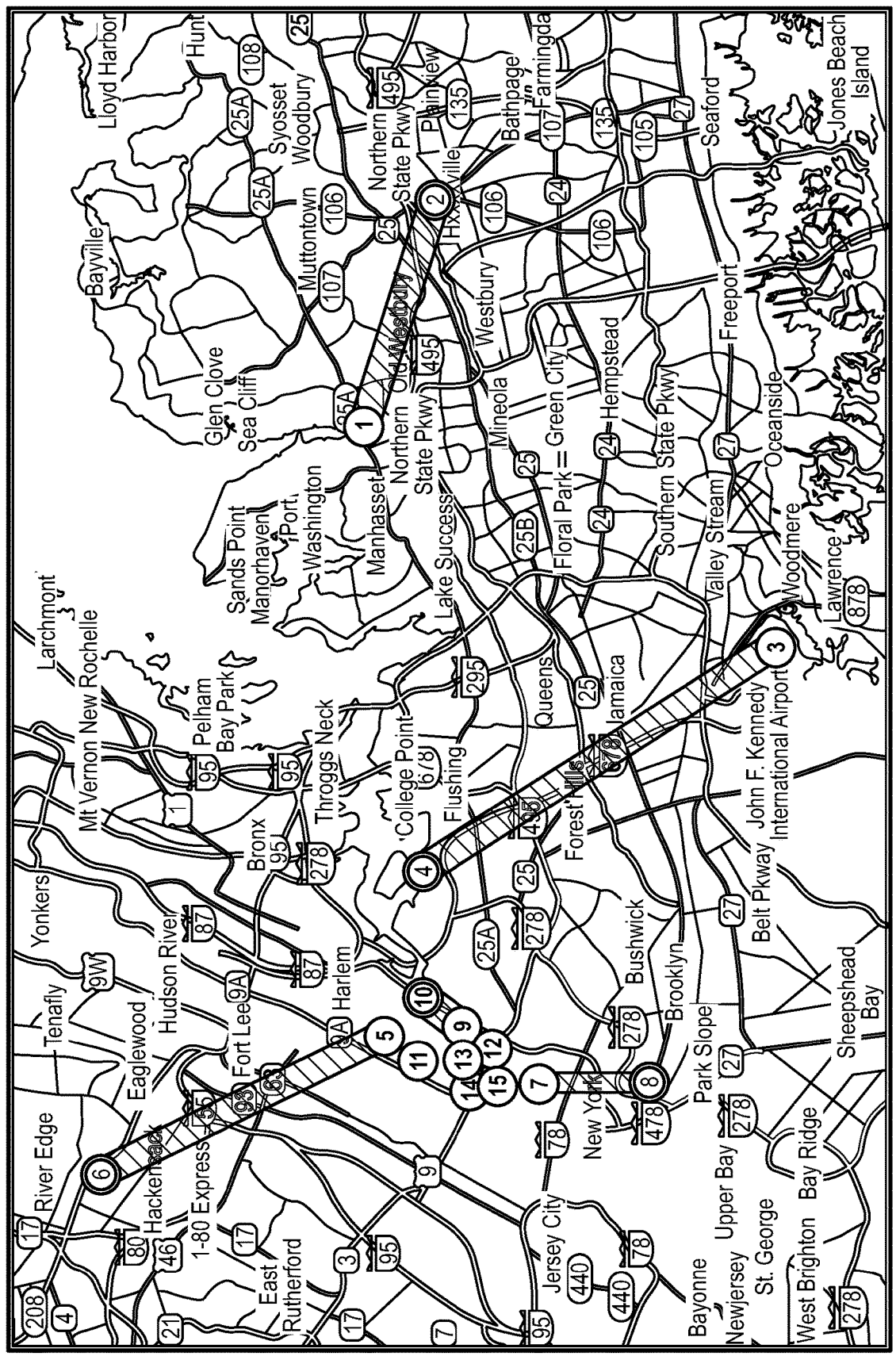
FIGS. 4A-4C illustrate exemplary approaches that the vehicle rental system shown in FIG. 3 may execute to select specific rental stores within a particular city.
Figure 4B:
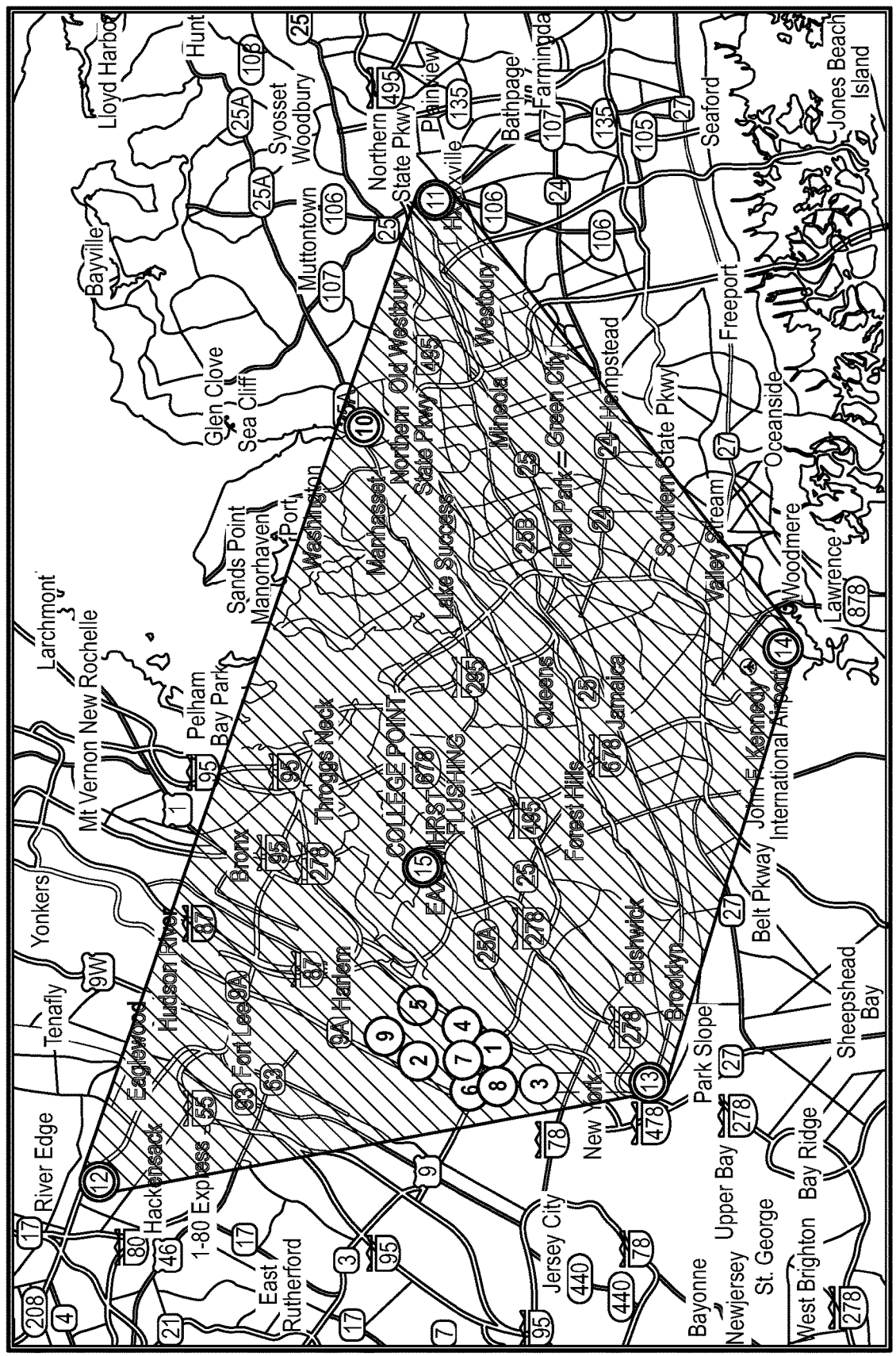
Figure 4C:
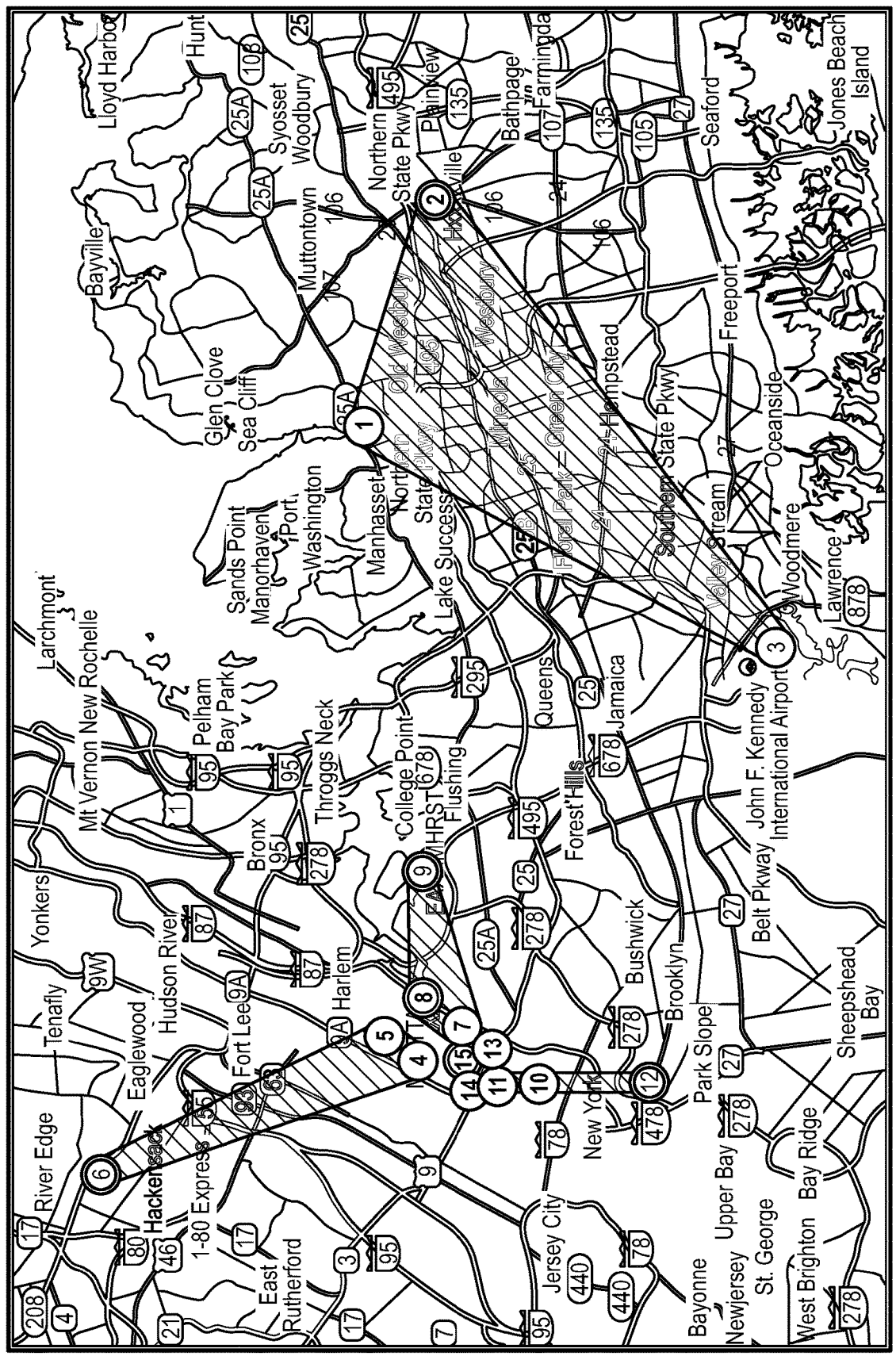

FIGS. 4A-4C, which are described in greater detail below, illustrate exemplary processes for selecting the particular number of rental stores n, where the pick-up location and the drop-off location are both New York City and a single rental provider is searched. In the exemplary embodiments as shown in FIGS. 4A-4C, the rental provider Avis® is used. As seen in FIGS. 4A-4C, Avis® includes fifteen rental stores within New York City. The rental stores are each numbered in a sequential fashion as 1, 2, 3, 4, 5, 6, 7, 8, 9, 10, 11, 12, 13, 14, and 15.

Referring now to FIGS. 3 and 4A, in one approach a user may prefer to rent a vehicle based solely on the location of the rental store. Thus, the user may set the value of the coverage ratio R to the maximum value of 1. Accordingly, as seen in FIG. 4A, the ranking module 62 may divide the fifteen rental stores into ten clusters, where five clusters include two rental stores and five clusters include a single rental store. Specifically, rental stores 1-10 are grouped into clusters of two rental stores, based on the geographical position or proximity of each rental store to another. For example, rental store 1 and rental store 2 are located closest to one another and are therefore grouped together into a single cluster. The ranking module 62 may then select single stores within each cluster that offers the lowest price, which are rental stores 1, 3, 5, 7, 9, 11, 12, 13, 14 and 15.

Turning now to FIGS. 3 and 4B, in another approach a user may prefer to rent a vehicle based solely on price, regardless of where the rental store is located within New York City. Thus, the user may set the coverage ratio R to its minimum value of zero. Accordingly, the ranking module 62 may divide the fifteen rental stores into a single cluster. The ranking module 62 may then select ten rental stores that officer the lowest price, which are rental stores 1, 2, 3, 4, 5, 6, 7, 8, 9, and 10 in this particular example.

Turning now to FIGS. 3 and 4C, in yet another approach a user may prefer to rent a vehicle based on both price as well as the location of the rental store. This, the user may set the value of the coverage ratio R to 0.5. Thus, the ranking module 62 calculates the total number of clusters k to be 5 using Equation 4 above. Accordingly, the ranking module 62 may divide the fifteen rental stores into five clusters that each include three stores, and then selects two stores from each cluster offering the lowest rates, which are rental stores 1, 2, 4, 5, 7, 8, 10, 11, 13, and 14.

Referring back to FIG. 3, once the ranking module 62 of the vehicle rental system 12 has selected the particular number of rental stores n, the ranking module 62 of the vehicle rental system 12 may then send one or more availability requests 86 to a particular rental provider computer system 20. The availability requests 86 includes the origin and destination pairs, which indicate the selected rental stores in the pick-up location and the drop-off location. In response to receiving each availability request 86, the rental provider computer system 20 may generate a respective return message 90 back to the ranking module 62. The return message 90 contains a list of vehicles and their associated rental rates for each rental store included in the availability request 86 between the pick-up date and the drop-off date. Specifically, as seen in FIG. 5, the return message 90 may include a list 100 of available vehicles (the rental rates are not shown in FIG. 5). The list 100 may indicate specific vehicle characteristics for each particular vehicle.

In the exemplary embodiment shown in FIG. 5, the vehicle characteristics may include attributes defined by ACRISS codes. The ACRISS code for each vehicle may include four unique characters, where each character is associated with a particular attribute of the vehicle. Specifically, the first character of the code is associated with a category, a second character is associated with chassis, a third character is associated with transmission, and a fourth character is associated with fuel type. The category of a vehicle may be classified as economy (which is denoted as an E), intermediate (which is denoted as an I), or full-size (which is denoted as an F). The chassis of a vehicle may be 2-4 door (which is denoted as C), 4-5 door (which is denoted as a D), passenger van (which is denoted as a V), and monospace (which is denoted as an M). The transmission of a vehicle may be classified as manual (denoted as M) or automatic (denoted as A). The fuel type of a vehicle may be classified as petrol or gasoline (denoted as a R) or diesel (denoted as a D).

Figure 6:
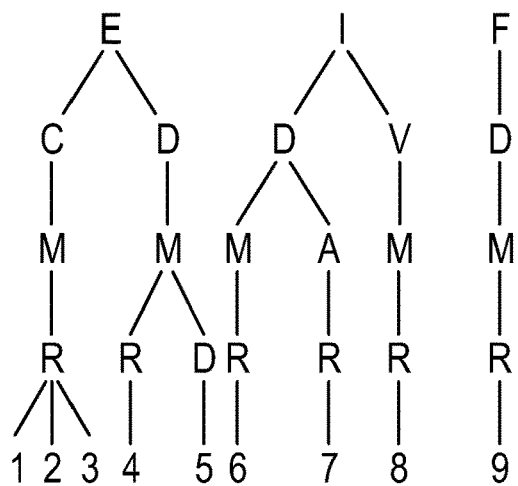
FIG. 6 is a diagram of the ACRISS codes for each available vehicle shown in FIG. 5, where available vehicles are categorized according to four ACRISS characteristics.

Turning back to FIG. 3, in response to receiving the return message 90, the ranking module 62 of the vehicle rental system 12 may first sort the vehicles based on the vehicle characteristics and rental rates, and then ranks the vehicles based on the least expensive rate for each vehicle characteristic. Referring to FIGS. 3 and 5-6, the ranking module 62 may first assign a vehicle identification (ID) number to each vehicle based on the vehicle category and rental rate. For example, in the embodiment as shown in FIG. 5-6, the lowest category is economy E. There are five vehicles having the category economy. The five vehicles are then assigned a specific vehicle ID number, where the vehicle with the lowest rental rate in the economy category is assigned a vehicle ID number as 1, and the most expensive vehicle within the economy category is assigned a vehicle ID number as 5. The ranking module 62 may then proceed to the next highest category, which is intermediate I. There are three vehicles having the category intermediate. The three vehicles are then assigned a specific vehicle ID number, where the vehicle with the lowest rental rate in intermediate category assigned a vehicle ID number as 6, and the vehicle with the highest rental rate in the intermediate category is assigned a vehicle ID number as 8. Since there is only one vehicle remaining in the full-size category, this vehicle is assigned a vehicle ID number as 9.

Once all of the vehicles have been assigned a vehicle ID, then the ranking module 62 of the vehicle rental system 12 may rank the vehicles based on the lowest priced vehicle for each particular attribute associated with each vehicle, where the least expensive vehicle associated with a particular attribute is ranked first. Specifically, the ranking module 62 may rank the vehicles in order of the characters associated with the ACRISS code in a sequential manner, where the first character of the ACRISS code, which is the category, is evaluated first for the lowest priced vehicle. Then, the second character of the ACRISS code is evaluated for its lowest price vehicle. Next, the third character of the ACRISS code is evaluated for its lowest priced vehicle. Then, the fourth character of the ACRISS code is evaluated for its lowest priced vehicle. The ranking module 62 of the vehicle rental system 12 may then return to the first character of the ACRISS code, and evaluate the remaining vehicles that have not been ranked. The ranking module 62 of the vehicle rental system 12 may then proceed to rank the other characters in the ACRISS code in a sequential fashion until all of the vehicles have been assigned a rank.

For example, as seen in FIGS. 5-6, there are total of five vehicles having economy E as its category. The ranking module 62 may select the economy vehicle offering the lowest price, which the vehicle having a vehicle ID of 1, and ranks that particular vehicle first. The ranking module 62 may then proceed to the next highest ranked category, which is intermediate I. As seen in FIGS. 5-6, there are three vehicles having intermediate as its category. The ranking module 62 may then select the intermediate vehicle offering the lowest price, and ranks that particular vehicle as second. The ranking module 62 may then proceed to the highest ranked category, which is full size F. Since there is only one vehicle ranked as full-size F, this vehicle is ranked third.

The ranking module 62 may then proceed to the second character of the ACRISS code, which is chassis. The ranking module 62 may then select the lowest price vehicle associated with the lowest ranked chassis, which is 2-4 door C. As seen in FIG. 6, since the lowest priced vehicle with the 2-4 door chassis C was already ranked (vehicle ID 1), the ranking module 62 may proceed to the next highest ranked chassis, which is 5-6 door D. The ranking module 62 may then select the 5-6 door vehicle offering the lowest price as fourth. The ranking module 62 may then proceed to the next highest rated chassis, which is passenger van V, and selects the passenger van vehicle offering the lowest price. Since there is only one vehicle (vehicle ID 8) that includes the passenger van V as its chassis, the second module rates this particular vehicle fifth. Then, the second module may proceed to the highest ranked chassis, which is monospace M.

Since the only vehicle ranked as monospace M has already been ranked (vehicle ID 9), the ranking module 62 of the vehicle rental system 12 may then rank the vehicles based on the third character of the ACRISS code, which is transmission. The ranking module 62 may then select the lowest price vehicle associated with the lowest ranked transmission, which is manual M. As seen in FIGS. 5-6 since the lowest priced vehicle with a manual transmission is already ranked (vehicle ID 1), the ranking module 62 may proceed to the next level of transmission, which is automatic A. As seen in FIGS. 5-6, there is only one unranked vehicle having an automatic transmission. The ranking module 62 may select the vehicle with automatic transmission (vehicle ID 7) and ranks that particular vehicle sixth.

The ranking module 62 of the vehicle rental system 12 may then rank the vehicles based on the fourth character of the ACRISS code, which is fuel type. The ranking module 62 may then select the lowest price vehicle associated with the lowest ranked fuel type, which is diesel D. The ranking module 62 may then select the vehicle having diesel as its fuel type which offers the lowest price (vehicle ID 5) and ranks that particular vehicle as seventh. The ranking module 62 may then proceed to return back to the first character of the ACRISS code, which is category. The ranking module 62 may select the economy vehicle offering the lowest price, which the vehicle having a vehicle ID of 2, and ranks that particular vehicle eighth. The remaining vehicle left is then ranked ninth.

It is to be appreciated that the above-mentioned ranking system as illustrated in FIGS. 5-6 may attribute a low priority to rental rates for similar vehicles, which ensures that similar rates for similarly equipped vehicles may be discarded when the vehicle rental system 12 eventually consolidates the rates of the vehicle rental providers and places the rates into a message which is sent to the client device 18, which is explained in greater detail below. As a result, consumers may obtain a diversified choice of available rental vehicles. In contrast, some vehicle rental systems today may simply offer a consumer a choice of mostly economy vehicles, and only a few other options, since the highest rental rates are usually discarded. Moreover, those of ordinary skill in the art will appreciate that the approach illustrated in FIGS. 5-6 is merely exemplary in nature, and that any number of vehicles having any combination of vehicle characteristics may be used as well.

Turning back to FIG. 3, once all of the vehicles in the list 100 (FIG. 5) have been ranked, then the ranking module 62 may then send a message 110 to the interface module 60. The message 110 contains all of the vehicles in the list 100, as well as their ranking information. In response to receiving the message 110, the interface module 60 may then build a message 120 containing the attributes and information pertaining to each vehicle, and stores the message 120 in a database 112. It is to be appreciated that the message 120 does not include the vehicle rental rates. The message 120 may then be re-calculated to include both the attributes of the vehicles as well as the vehicle rental rates. The size of the re-calculated message 120 may then be determined by the interface module 60. If the size of the re-calculated message 120 stored in the database 112 exceeds a predetermined size such as, for example, 400 kilobytes, then the interface module 60 may then truncate the re-calculated message 120 by discarding the lowest-ranked vehicles until the re-calculated message 120 is at or below the predetermined size, which is described in greater detail below. Once the message 120 stored in the database 112 has been truncated so as to be equal to or less than the predetermined size, the message may be sent to the client device 18.

FIGS. 7A-7D illustrate an exemplary diagram demonstrating the interface module 60 consolidating and discarding several rental rates. As seen in FIG. 7A, there are two rental providers included, Europcar (EP) and Hertz (ZE). There are thirteen rental rates that are listed in euros €. Referring now to both FIGS. 3 and 7A, the interface module 60 may first sort the rental rates per rental provider by price, where the least expensive rental rate for a particular rental provider is listed first. Referring to FIGS. 3 and 7B, each rental rate is then ranked in ascending order, where the least expensive rate for Europcar is ranked first, and the least expensive rate for Hertz is ranked second. As seen in FIG. 7B, the rental rates are ranked so as to alternate between the two rental providers, Europcar and Hertz. It is to be appreciated that because of the double ranking system as described above, the disclosure allows for equity such that a user may compare rates for each rental provider for all vehicle categories (e.g., economy, intermediate, and full-size).

The interface module 60 may then save the rental vehicles in the database 112 as the message 120. Specifically, the interface module 60 may first save the message 120, where the message 120 includes the vehicle characteristics pertaining to each of the rental vehicles. However, it is to be appreciated that the message 120 omits the rental rates. For example, in the embodiment as shown in FIGS. 7A-7D, the size of the message 120 may be 320 kilobytes. Then, the interface module 60 may re-calculate the message 120 so as to include the rental rates for each of the rental vehicles. In the exemplary embodiment as illustrated, the re-calculated message size is 450 kilobytes. The interface module 60 may then determine if the re-calculated message size exceeds the predetermined size. In the exemplary embodiment as shown in FIGS. 7A-7D, the predetermined size is 400 kilobytes. Thus, the re-calculated message size exceeds the predetermined size by 50 kilobytes. The interface module 60 may then determine the average size of each vehicle rental rate in the message 120 by subtracting the re-calculated message size from the original message size, and then dividing the difference by the total number of rental rates. In the embodiment as described, this would be 450 kilobytes subtracted from 320 kilobytes, which yields 130 kilobytes. Thus, the average message size of each vehicle rental rate would be 10 kilobytes (i.e., 130 kilobytes/13 rental vehicles=10 kilobytes).

The interface module 60 may then determine the total number of vehicle rental rates that need to be discarded such that the message 120 does not exceed the predetermined size. In the exemplary embodiment as shown in FIG. 7C, the interface module 60 determines that five rental rates should be discarded. The interface module 60 may then discard the most expensive vehicle rental rates for each rental provider (i.e., the rental vehicles ranked as 9-13), and then re-calculates the message 120 again to ensure that the message 120 does not exceed the predetermined size. If the message 120 does not exceed the predetermined size, then the message 120 may be sent to the client device 18. As seen in FIGS. 7C-7D, the five highest rental rates, 9-13, are discarded. The interface module 60 may then re-calculate the size of the message 120, which is 395 kilobytes. Since the size of the message 120 does not exceed the predetermined size, the message 120 may now be sent to the client device 18.

Referring generally to the figures, the disclosed system improves the overall efficiency of processing data associated with searching for rental vehicles, and also solves a problem that is rooted in computer technology. As explained above, the computer systems utilized by at least some rental providers tend to have relatively low processing power, and therefore are only able to process a limited number of requests in a given period of time. The disclosed system overcomes this limitation by first truncating or discarding rental stores from the queries sent to a computer system of a particular rental provider based on the user-defined coverage ratio R. The coverage ratio R ensures that a traveler will be able to view available vehicle rentals based on the lowest prices, the geographical coverage of a particular city, or a combination of both these factors.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A vehicle rental system for providing available rental vehicle options to a user, the system comprising:
    a network interface coupling the system with a rental provider computer system;
    a processor coupled to the network interface; and
    a memory coupled to the processor, the memory storing data comprising program code that, when executed by the processor, causes the system to:
        receive a rental request for an available rental vehicle, wherein the rental request includes a coverage ratio, a pick-up location, and a drop-off location; and
        in response to receiving the rental request:
            query a rental store database of the rental provider computer system for a plurality of available rental stores in both the pick-up location and the drop-off location;
            determine a number of clusters in at least one of the pick-up location and the drop-off location, wherein the number of clusters is based on the coverage ratio, a computing power, and a total number of available rental stores located within one of the pick-up location and the drop-off location, wherein the computing power is defined as a number of requests that a processor of the rental provider computer system is capable of processing in a given period of time for an availability request, and wherein a higher value of the coverage ratio results in an increased total number of clusters;
            arrange the plurality of available rental stores into at least one cluster in at least one of the pick-up location and the drop-off location based on a geographical position of the plurality of available rental stores, by dividing the plurality of available rental stores into the determined number of clusters;
        determine a number of available rental stores within each cluster in both the pick-up location and the drop-off location, wherein the number of available rental stores within each cluster is determined based on the coverage ratio, the computing power, and the total number of available rental stores located within one of the pick-up location and the drop-off location;
        create a set of availability queries comprising origin and destination pairs with the number of available rental stores within each cluster in both in the pick-up location and the drop-off location; and
            send an availability request to the rental provider computer system, the availability request comprising a query of the rental provider computer system for rate and availability information of rental vehicles for each availability query of the set of availability queries.

2. The system of claim 1, wherein the number of queries in the set of availability queries sent to the rental provider computer system in the availability request does not exceed a maximum number of requests that the processor of the rental provider computer system is capable of processing in a given period of time for an availability request.

3. The system of claim 1, wherein the coverage ratio ranges between a one-cluster value and a maximum-cluster value, wherein the one-cluster value represents arranging the plurality of available rental stores within a particular city as a single cluster, and the maximum-cluster value represents arranging the plurality of available rental stores by dividing an entire set of available rental stores into a maximum amount of clusters.

4. The system of claim 1 further comprising:
    a user interface comprising a screen, wherein the screen displays a setting bar and cursor, and a value of the coverage ratio is adjusted by sliding the cursor along the along the setting bar.

5. The system of claim 1, wherein the pick-up location is different from the drop-off location.

6. The system of claim 1, wherein the pick-up location is the same as the drop-off location.

7. A method for providing available rental vehicle options to a user, the method comprising:
    receiving a rental request for an available rental vehicle, wherein the rental request includes a coverage ratio, a pick-up location, and a drop-off location; and
    in response to receiving the rental request:
        querying a rental store database of a rental provider computer system for a plurality of available rental stores in both the pick-up location and the drop-off location;
        determining a number of clusters in at least one of the pick-up location and the drop-off location, wherein the number of clusters is based on the coverage ratio, a computing power, and a total number of available rental stores located within one of the pick-up location and the drop-off location, wherein the computing power is defined as a number of requests that a processor of the rental provider computer system is capable of processing in a given period of time for an availability request, and wherein a higher value of the coverage ratio results in an increased total number of clusters;
        arranging the plurality of available rental stores into at least one cluster in at least one of the pick-up location and the drop-off location based on a geographical position of the plurality of available rental stores, by dividing the plurality of available rental stores into the determined number of clusters;
        determining a number of available rental stores within each cluster in both the pick-up location and the drop-off location, wherein the number of available rental stores within each cluster is determined based on the coverage ratio, the computing power, and the total number of available rental stores located within one of the pick-up location and the drop-off location;
        creating a set of availability queries comprising origin and destination pairs with the number of available rental stores within each cluster in both in the pick-up location and the drop-off location; and
        sending an availability request to the rental provider computer system, wherein the availability request comprises querying the rental provider computer system for rate and availability information of rental vehicles for each availability query of the set of availability queries.

8. The method of claim 7, wherein the number of queries in the set of availability queries sent to the rental provider computer system in the availability request does not exceed a maximum number of requests that the processor of the rental provider computer system is capable of processing in a given period of time for an availability request.

9. The method of claim 7, wherein the coverage ratio ranges between a one-cluster value and a maximum-cluster value, wherein the one-cluster value represents arranging the plurality of available rental stores within a particular city as a single cluster, and the maximum-cluster value represents arranging the plurality of available rental stores by dividing an entire set of available rental stores into a maximum amount of clusters.

10. The method of claim 7, wherein the pick-up location is different from the drop-off location.

11. The method of claim 7, wherein the pick-up location is the same as the drop-off location.

12. A computer program product for providing available rental vehicles options to a user, the computer program product comprising:
a non-transitory computer-readable storage medium; and
program code stored on the non-transitory computer-readable storage medium that, when executed by one or more processors, causes the one or more processors to:
receive a rental request for an available rental vehicle, wherein the rental request includes a coverage ratio, a pick-up location, and a drop-off location; and
in response to receiving the rental request:
query a rental store database of a rental provider computer system for a plurality of available rental stores in both the pick-up location and the drop-off location;
determine a number of clusters in at least one of the pick-up location and the drop-off location, wherein the number of clusters is determined based on the coverage ratio, a computing power, and a total number of available rental stores located within one of the pick-up location and the drop-off location, wherein the computing power is defined as a number of requests that a processor of the rental provider computer system is capable of processing in a given period of time for an availability request, and wherein a higher value of the coverage ratio results in an increased total number of clusters;
arrange the plurality of available rental stores into at least one cluster in at least one of the pick-up location and the drop-off location based on a geographical position of the plurality of available rental stores, by dividing the plurality of available rental stores into the determined number of clusters;
determine a number of available rental stores within each cluster in both the pick-up location and the drop-off location, wherein the number of available rental stores within each cluster is determined based on the coverage ratio, the computing power, and the total number of available rental stores located within one of the pick-up location and the drop-off location;
create a set of availability queries comprising origin and destination pairs with the number of available rental stores within each cluster in both in the pick-up location and the drop-off location; and
send an availability request to the rental provider computer system, the availability request comprising a query of the rental provider computer system for rate and availability information of rental vehicles for each availability query of the set of availability queries.

13. The system of claim 1, wherein the coverage ratio is a user-selectable value that is configured to enable the user to convey preferences with respect to price in the rental request.

14. The system of claim 1, wherein the pick-up location is different from the drop-off location, and determining the number of clusters is based on:
computing a mathematical function floor sqrt of the computing power;
computing a mathematical function min of (i) the total number of available rental stores, and (ii) the computed floor sqrt of the computing power; and
computing a mathematical function ceil of the coverage ratio multiplied by the computed min of (i) the total number of available rental stores, and (ii) the computed floor sqrt of the computing power.

15. The system of claim 1, wherein the pick-up location is the same as the drop-off location, and determining the number of clusters is based on:
computing a mathematical function min of (i) the total number of available rental stores, and (ii) the computing power; and
computing a mathematical function ceil of the coverage ratio multiplied by the computed min of (i) the total number of available rental stores, and (ii) the computing power.

16. The method of claim 7, wherein the pick-up location is different from the drop-off location, and determining the number of clusters is based on:
computing a mathematical function floor sqrt of the computing power;
computing a mathematical function min of (i) the total number of available rental stores, and (ii) the computed floor sqrt of the computing power; and
computing a mathematical function ceil of the coverage ratio multiplied by the computed min of (i) the total number of available rental stores, and (ii) the computed floor sqrt of the computing power.

17. The method of claim 7, wherein the pick-up location is the same as the drop-off location, and determining the number of clusters is based on:
computing a mathematical function min of (i) the total number of available rental stores, and (ii) the computing power; and
computing a mathematical function ceil of the coverage ratio multiplied by the computed min of (i) the total number of available rental stores, and (ii) the computing power.

* * * * *